United States Patent [19]

Hornak et al.

[11] Patent Number: 5,414,742
[45] Date of Patent: May 9, 1995

[54] LEAK-DETECTION SYSTEM AND METHOD FOR DETECTING A LEAKING CONTAINER

[75] Inventors: Leonard P. Hornak, Wilkins Township, Allegheny County; Ralph W. Tolino, Wilkinsburg; Robert B Salton, Plum Boro, all of Pa.

[73] Assignee: Westinghouse Electric Corporation, Pittsburgh, Pa.

[21] Appl. No.: 150,710

[22] Filed: Nov. 10, 1993

[51] Int. Cl.⁶ .............................................. G21C 17/00
[52] U.S. Cl. ...................................... 376/251; 376/250
[58] Field of Search ............... 376/251, 250, 253, 245, 376/450, 256; 976/DIG. 209

[56] References Cited

U.S. PATENT DOCUMENTS

| | | | |
|---|---|---|---|
| 3,644,172 | 2/1972 | Campbell | 376/250 |
| 3,929,570 | 12/1975 | Jones et al. | 376/450 |
| 3,940,311 | 2/1976 | Frisch | 376/224 |
| 4,082,607 | 4/1978 | Divona | 376/253 |
| 4,091,283 | 5/1978 | Sun | 250/303 |
| 4,248,666 | 2/1981 | Olsson | 376/253 |
| 4,318,775 | 3/1982 | Berlin et al. | 376/253 |
| 4,363,972 | 12/1982 | Kuhlman et al. | 250/430 |
| 4,406,855 | 9/1983 | Schwiers et al. | 376/250 |
| 4,416,847 | 11/1983 | Saito et al. | 376/253 |
| 4,537,740 | 8/1985 | Colburn | 376/256 |
| 4,650,637 | 3/1987 | Chubb | 376/253 |
| 4,764,335 | 8/1988 | Gross et al. | 376/253 |
| 4,921,662 | 5/1990 | Franklin et al. | 376/316 |
| 5,009,835 | 4/1991 | Ahmed | 376/251 |

*Primary Examiner*—Donald P. Walsh
*Assistant Examiner*—Meena Chelliah
*Attorney, Agent, or Firm*—Walter S. Stevens

[57] ABSTRACT

Leak-detection system and method for detecting a leaking container. The system includes an enclosure defining a cavity therein surrounding the container, which container may be a nuclear fuel rod having fission products leaking through a breach in the exterior surface of the fuel rod. The fission products are capable of adhering to the exterior surface of the fuel rod as the fission products leak through the breach in the fuel rod. A radiation detector is in communication with the cavity for detecting the fission products leaking through the breach. Moreover, a gas injector is in communication with the cavity for injecting a multiplicity of carrier gas bubbles into the cavity to remove any fission products adhering to the exterior surface of the fuel rod and to carry the fission products removed thereby to the radiation detector. In this manner, the detector detects the leaking fission products even though they may tend to adhere to the exterior surface of the fuel rod. In addition, an elevator is connected to the fuel assembly for elevating the fuel assembly in the cavity, so that the external pressure acting against the exterior surface of the fuel rods is reduced in order to relieve the internal pressure in the fuel rods. As the fuel assembly is elevated, any fission products tending to "hide-out" in the fuel rods expand and migrate through the breach. As the fission products migrate through the breach, they are carried by the carrier gas bubbles to the radiation detector where they are detected by the radiation detector. In this manner, otherwise undetectable leaking fuel rods become detectable.

20 Claims, 7 Drawing Sheets

LEAK-DETECTION SYSTEM AND METHOD FOR DETECTING A LEAKING CONTAINER

BACKGROUND

This invention generally relates to leak detection and more particularly relates to a leak-detection system and method for detecting a leaking container, which leaking container may be a leaking nuclear fuel rod having a radioactive fission product material leaking therefrom.

However, before discussing the current state of the art, it is instructive first to briefly describe the structure and operation of a typical nuclear reactor which may contain leaking fuel rods. In this regard, a typical nuclear reactor includes a pressure vessel containing a plurality of fuel assemblies therein defining a nuclear reactor core capable of producing heat by fission of fissile nuclear material. More specifically, each fuel assembly includes a plurality of fuel rods having the fissile nuclear material sealingly contained therein in the form of a plurality of coaxially stacked fuel pellets. As the fissile material forming the fuel pellets fissions, radioactive fission products (e.g., Xenon - 135 and Kr-85) are produced within the fuel rod. Such radioactive fission products are normally sealingly contained within the fuel rod because the fuel pellets producing the fission products are themselves sealingly contained within the fuel rod. Liquid moderator coolant (i.e., demineralized water) is caused to flow through the fuel assemblies and over the fuel rods for assisting in the fission process and for removing the heat produced by the fission process. During operation of the nuclear reactor, the heat due to fission of the fissile material is carried from the fuel rods by the liquid moderator coolant, which flows from the pressure vessel and through a piping system connected to the pressure vessel and thence ultimately to a turbine-generator for generating electricity in a manner well understood in the art.

However, the fuel rods may occasionally leak. Leaking fuel rods are undesirable because such leaking fuel rods may release the radioactive fission products into the liquid moderator coolant flowing over the fuel rods, thereby radioactively contaminating any reactor system components in fluid communication with the coolant. Such reactor components may be, for example, structures housed within the pressure vessel, piping interconnecting the components of the reactor system, cooling tower apparatus or the turbine belonging to the previously mentioned turbine-generator. Increased levels of radioactive contamination in these reactor system components increases the time required for servicing the components because the components are typically decontaminated prior to servicing in order to reduce radiation exposure to service personnel. Moreover, leaking fuel rods increase the risk of discharging higher levels of radioactivity into the environment surrounding the nuclear reactor through an off-gas system associated with the nuclear reactor. Therefore, in order to avoid such undesirable radioactive contamination of reactor system components and the environment surrounding the reactor, it is important to detect any leaking fuel rods. If a leaking fuel rod is detected, it is replaced with a non-leaking fuel rod.

A prior art method of leak-detection includes latching a transport mechanism to the fuel assembly and removing the fuel assembly from the reactor core, such as during routine refueling operations of the reactor core. The fuel assembly is transported to a remote test chamber and placed therein to perform the leak-detection procedure. After being transported to the test chamber, the transport mechanism is unlatched from the fuel assembly. Next, while the fuel assembly resides in the test chamber, a vacuum is drawn in the test chamber to produce a pressure differential across the fuel assembly that facilitates migration of the fission product out any leaking or breached fuel rods. This also prevents the fission products from "hiding-out" in the breached fuel rod. The fission product material migrating out any leaking fuel rod is detected as it travels past a suitable detector located in the test chamber. If the fuel assembly contains no leaking fuel rods, the latching mechanism is again connected to the fuel assembly for reloading the fuel assembly into the reactor core or into a spent fuel pool depending on whether the nuclear fuel in the fuel assembly is capable of further fissions. On the other hand, if the fuel assembly contains a leaking fuel rod, the fuel rod is preferably replaced with a non-leaking fuel rod before being reloaded into the reactor core or transported to the spent fuel pool. Although this procedure has proven satisfactory for detecting leaking fuel rods, it is time consuming because each fuel assembly to be tested is latched, transported to the test chamber, unlatched, tested, relatched and then returned to the reactor core or transported to the spent fuel pool. Such a time consuming procedure undesirably lengthens the time required to refuel the reactor core. Therefore, a problem in the art is to provide a leak-detection apparatus and method that is less time consuming.

Moreover, applicants have discovered that at least some of the fission product material leaking from a breached fuel rod may undesirably adhere to the exterior surface of the fuel rod such that the fission product is not detectable by the detector. In addition, applicants have discovered that some of the fission product material may continue to "hide-out" in the fuel rod and may not sufficiently migrate out the breached fuel rod in order for it to be detected, even when subjected to the previously mentioned vacuum which is drawn in the test chamber. Therefore, another problem in the art is to detect leaking fuel rods even though the fission product material leaking from the fuel rod may adhere to the exterior surface of the fuel rod and even though the fission product material may tend to "hide-out" in the fuel rod.

Another method for detecting leaking nuclear fuel assemblies is disclosed in U.S. Pat. No. 4,416,847 titled "Method and Apparatus for Detecting Failure of Nuclear Fuel" issued Nov. 22, 1983 in the name of Shozo Saito, et al. This patent discloses a method for detecting failure of nuclear fuel which method comprises supplying air into a sipper cap mounted on a fuel assembly to form an air layer, isolating the fuel assembly to be detected from other assemblies, soaking the fuel assembly in a water bath, discharging the water from the system, and sampling that includes introducing a predetermined amount of cooling water in the fuel assembly and discharging the water to a sample receptacle. However, this patent does not appear to disclose a solution to the problem of adequately removing fission product material adhering to the exterior surface of the fuel rods and does not appear to disclose a solution to the problem of detecting fission product material that may tend to "hide-out" in the fuel rods.

Although the above-recited prior art disclose leak-detection apparatus and methods, the above-recited prior art do not appear to disclose a leak-detection system and method for suitably detecting a leaking container, which leaking container may be a leaking nuclear fuel rod having a radioactive fission product material leaking therefrom.

Therefore, what is needed are a leak-detection system and method for detecting a leaking container, which leaking container may be a leaking nuclear fuel rod having a radioactive fission product material leaking therefrom.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings wherein:

SUMMARY OF THE INVENTION

Figure 1:
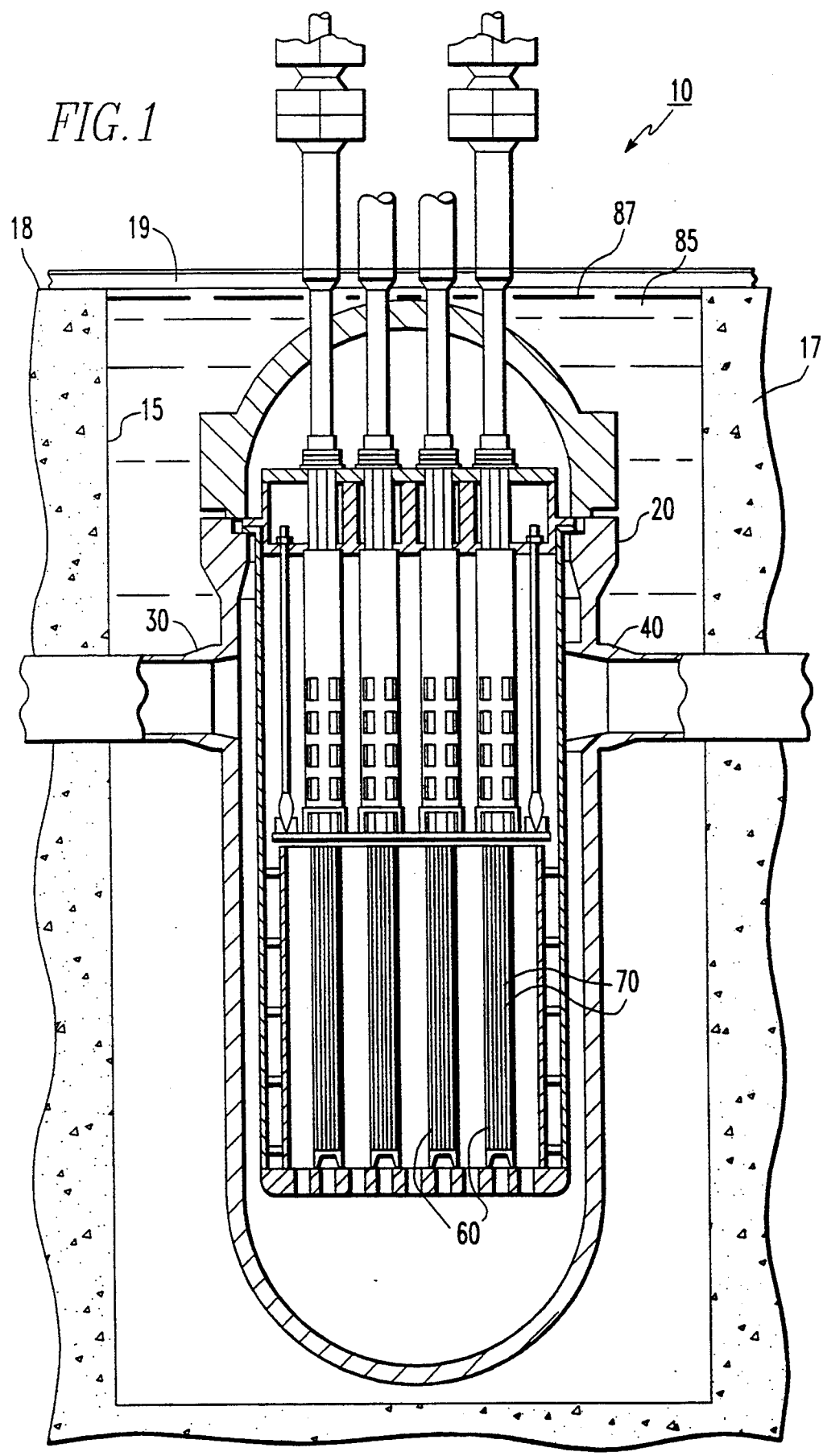
FIG. 1 shows in partial vertical section, a typical nuclear reactor pressure vessel with parts removed for clarity, the pressure having a closure head sealingly attached thereto and a plurality of nuclear fuel assemblies disposed therein.

Disclosed herein is a leak-detection system and method for detecting a leaking container. The system includes an enclosure defining a cavity therein surrounding the container, which container may be a nuclear fuel rod having fission products leaking through a breach in the exterior surface of the fuel rod. The fission products are capable of adhering to the exterior surface of the fuel rod as the fission products leak through the breach in the fuel rod. A radiation detector is in communication with the cavity for detecting the fission products leaking through the breach. Moreover, a gas injector is in communication with the cavity for injecting a multiplicity of carrier gas bubbles into the cavity to remove any fission products adhering to the exterior surface of the fuel rod and to carry the fission products removed thereby to the radiation detector. In this manner, the detector detects the leaking fission products even though they may tend to adhere to the exterior surface of the fuel rod. In addition, an elevator is connected to the fuel assembly for elevating the fuel assembly in the cavity, so that the external pressure acting against the exterior surface of the fuel rods is reduced in order to relieve the internal pressure in the fuel rods. As the fuel assembly is elevated, any fission product gases and/or solids tending to "hide-out" in the fuel rods expand and migrate through the breach. As the fission products migrate through the breach, they are carried by the carrier by the carrier gas bubbles to the radiation detector where they are detected by the radiation detector. In this manner, otherwise undetectable leaking fuel rods become detectable.

The invention in its broad form is a leak-detection system for detecting a leaking container having a surface thereon and a material leaking therefrom, the material capable of adhering to the surface of the container as the material leaks from the container, comprising enclosure means surrounding the container for enclosing the container; detector means associated with said enclosure means for detecting the leaking material; and fluid injection means associated with said enclosure means for injecting a fluid into said enclosure means to remove the material adhering to the surface and to carry the material removed thereby to said detector means, so that said detector means detects the material leaking from the container.

The invention in its broad form is also a leak-detection method for detecting a leaking container having a material leaking from an exterior surface thereof, the material capable of adhering to the exterior surface, comprising the steps of enclosing the container by surrounding the container with an enclosure; detecting the material leaking from the container by operating a detector associated with the enclosure; and removing the material adhering to the exterior surface and carrying the material to the detector by injecting a fluid into the enclosure, so that the detector detects the material leaking from the container.

An object of the present invention is to provide a leak-detection system and method for detecting a leaking container, which leaking container may be a leaking nuclear fuel rod having a radioactive fission product material leaking therefrom.

Another object of the present invention is to provide a leak-detection method that is less time consuming than prior art leak-detection techniques.

Yet another object of the present invention is to provide a leak-detection system and method that detects a leaking fuel rod even though the fission product material leaking therefrom may adhere to the exterior surface of the fuel rod and even though the fission product material may tend to "hide-out" in the fuel rod.

A feature of the present invention is the provision of a radiation detector for detecting the fission product material leaking from an internally pressurized fuel rod.

Another feature of the present invention is the provision of a gas injector for injecting a gas into a liquid medium contained in an enclosure and surrounding the fuel assembly which includes the leaking fuel rod so as to form a multiplicity of gas bubbles in the liquid in order to remove the fission product material adhering to the exterior surface of the fuel rod and to carry the fission product material removed thereby to the detector for detecting the leaking fuel rod.

Yet another feature of the present invention is the provision of pressure relief means connected to the fuel rod for relieving the internal pressure in the fuel rod, so that the fission product material leaks from the fuel rod and into the liquid medium as the internal pressure is relieved in order to prevent the fission product material from "hiding-out" in the fuel rod.

An advantage of the present invention is that time required to detect leaking fuel rods is reduced.

Another advantage of the present invention is that leaking fuel rods otherwise undetectable are now detectable.

These and other objects, features and advantages of the present invention will become evident to those having ordinary skill in the art upon a reading of the following detailed description taken in conjunction with the accompanying drawings wherein there is shown illustrative embodiments of the invention.

DESCRIPTION OF THE PREFERRED EMBODIMENTS

Figure 6:
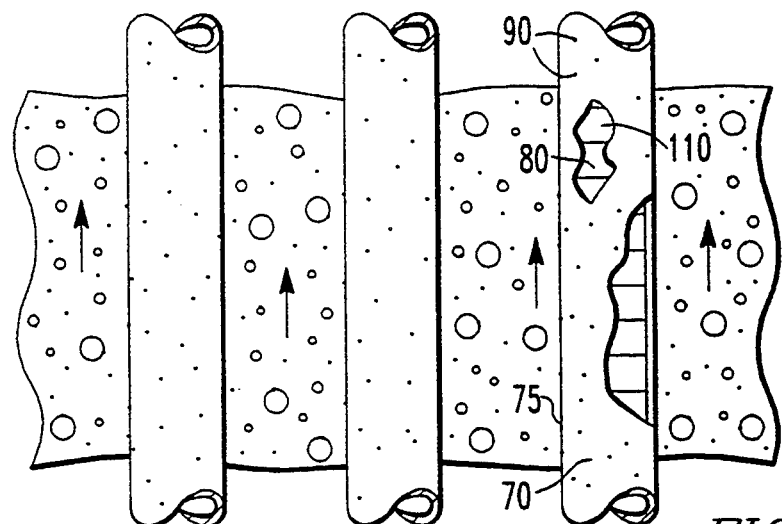
FIG. 6 is a fragmentation view in elevation of a breached fuel rod disposed in the interior cavity and showing the gas bubbles removing the fission product material leaking from a breach (exaggerated for clarity) in the fuel rod and adhering to the exterior surface of the fuel rod.

Referring to FIG. 1, there is shown a typical nuclear reactor, generally referred to as 10, for producing heat by the controlled fission of fissile nuclear fuel material. Reactor 10 includes a reactor pressure vessel 20 disposed in a reactor cavity 15 which is defined by a pressure vessel containment structure 17 surrounding pressure vessel 20. Containment structure 17 has an upper surface 18 thereon having a rail 19 attached thereto spanning reactor cavity 15, for reasons disclosed hereinbelow. Pressure vessel 20 is open at its top end and has a plurality of inlet nozzles 30 and outlet nozzles 40 attached to the upper portion thereof (only one of each nozzle is shown). A hemispherical closure head 50 is mounted atop pressure vessel 20 and is sealingly attached to the open top end of pressure vessel 20, such that closure head 50 sealingly caps pressure vessel 20. Capping pressure vessel 20 in this manner allows for suitable pressurization of a liquid moderator coolant (not shown) within pressure vessel 20. Moreover, disposed in pressure vessel 20 are a plurality of nuclear fuel assemblies 60, each fuel assembly 60 comprising a plurality of elongate nuclear fuel rods 70 having the fissile nuclear fuel material sealingly contained therein in the form of a plurality of coaxially stacked fuel pellets 80 (see FIG. 6). As shown in FIG. 1, each fuel rod 70 also has an exterior surface 75 and is prepressurized to a predetermined internal pressure of approximately 100 to 250 psia. In addition, pressure vessel 20 is submerged in a liquid medium 85 that serves as a biological shield for service personnel who may be located in the vicinity of pressure vessel 20.

During operation of nuclear reactor 10, the liquid moderator coolant enters inlet nozzle 30, circulates through pressure vessel 20 and then exits pressure vessel 20 through exit nozzle 40, whereupon it is piped to a heat exchange device (not shown) for generating steam. The steam is then piped from the heat exchange device to a turbine-generator set (not shown) for producing electricity in a manner well understood in the art. Moreover, as the nuclear material forming fuel pellets 80 fissions, gaseous and/or solid radioactive fission products 90 (e.g., Xenon-135 and Kr-85) are produced within the fuel rod 70 (see FIG. 6). Such radioactive fission products 90 are normally sealingly contained within fuel rod 70 because fuel pellets 80 producing the fission products 90 are themselves sealingly contained within fuel rods 70.

However, such fuel rods 70 may nonetheless occasionally leak and thus may radioactively contaminate reactor system components in fluid communication with the liquid moderator coolant. It is therefore desirable to detect such leaking fuel rods 70 in order to replace the leaking fuel rods 70, so that radioactive contamination of reactor system components is avoided.

Therefore, referring to FIG. 2, 3, 4, 5, 6, 7 and 8, there is shown the subject matter of the present invention, which is a leak-detection system, generally referred to as 100, for detecting a leaking container, which leaking container may be the leaking nuclear fuel rod 70 having the radioactive fission product material 90 leaking through a breach 110 in exterior surface 75 thereof. The fission product material 90 is capable of adhering to exterior surface 75 as it leaks through breach 110. Leak-detection system 100 comprises enclosure means, such as an elongate generally cylindrical enclosure 120 defining a cavity 130 axially therethrough, the cavity surrounding a selected one of the fuel assemblies 60 for enclosing fuel assembly 60 therein. As more fully disclosed hereinbelow, enclosure 120 is caused to penetrate liquid medium 85, so that surface 87 of liquid medium 85 is at a higher elevation than the top of fuel assembly 60. Also, for reasons disclosed in detail hereinbelow, enclosure 120 is preferably stationary during the leak-detecting process. Enclosure 120 has an open lower end portion 140 for allowing liquid medium 85 to enter and substantially fill cavity 130 of enclosure 120 and also has a substantially closed or capped upper end portion 135. However, in the preferred embodiment, liquid medium 85 does not completely fill cavity 130. That is, liquid medium 85 fills cavity 130 so as to define a liquid-free volume 150 in upper end portion 135 of enclosure 120 (i.e., the top portion of cavity 130). Thus, it will be understood from the description hereinabove, that exterior surface 75 of each fuel rod 70 is covered by liquid medium 85 and that the liquid medium 85 defines a hydrostatic pressure gradient acting against exterior surface 75 of fuel rod 70, the hydrostatic pressure gradient increasing as a function of depth of liquid medium 85.

Still referring to FIG. 2, 3, 4, 5, 6, 7 and 8, leak-detection system 100 further comprises detector means, such as a radiation detector assembly, generally referred to as 160, connected to enclosure 120 for detecting and measuring the leaking fission product material 90. Detector assembly 160 includes a suction pump 170 in communication, such as by a first conduit 180, with liquid-free volume 150 for suctioning fission product 90 from liquid-free volume 150, as described more fully hereinbelow. Detector assembly 160 also includes radiation-sensitive sensor 190 housed in a sensor chamber 195 that is in communication with suction pump 170, such as by the previously mentioned first conduit 180. Sensor 190 senses the radiation emitted by the radioactive fission product material 90 that is suctioned by suction pump 170. Sensor 190 is adapted to generate a sensor output signal in response to the radiation sensed thereby. An analyzer, generally referred to as 210, is electrically connected to sensor 190, such as by wiring 220, for receiving and then analyzing the sensor output signal. Analyzer 210 is adapted to generate an analyzer output signal associated with the analysis provided thereby. In the preferred embodiment of the invention, analyzer 210 may include a high voltage power supply 230 electrically connected, such as by wiring 220, to sensor 190 for activating sensor 190. Sensor 190 is also electrically connected to an analog ratemeter 240 that displays the average counts per unit time (e.g., per second) of radiation detected by sensor 190. By use of ratemeter 240 the quantity or intensity of radiation from fission product material 90 in sensor chamber 195 is detected as a function of time. A suitable amplifier 250 electrically interconnects sensor 190 and ratemeter 250. The purpose of amplifier 250 is to generate a sensor output signal useable by ratemeter 250. Electrically connected to analyzer 210 is a controller 260 for controlling the operation of analyzer 210. Controller 260 is capable of operating leak-detection system 100 in either a "manual" or "automatic" mode as described more fully hereinbelow. In addition, a display 270 is electrically connected to analyzer 210, such as by wiring 280, for receiving the analyzer output signal and for displaying the analyzer output signal received thereby. In this manner, the analysis provided by analyzer 210 is visually displayed to the operator of leak-detection system 100.

Figure 5:
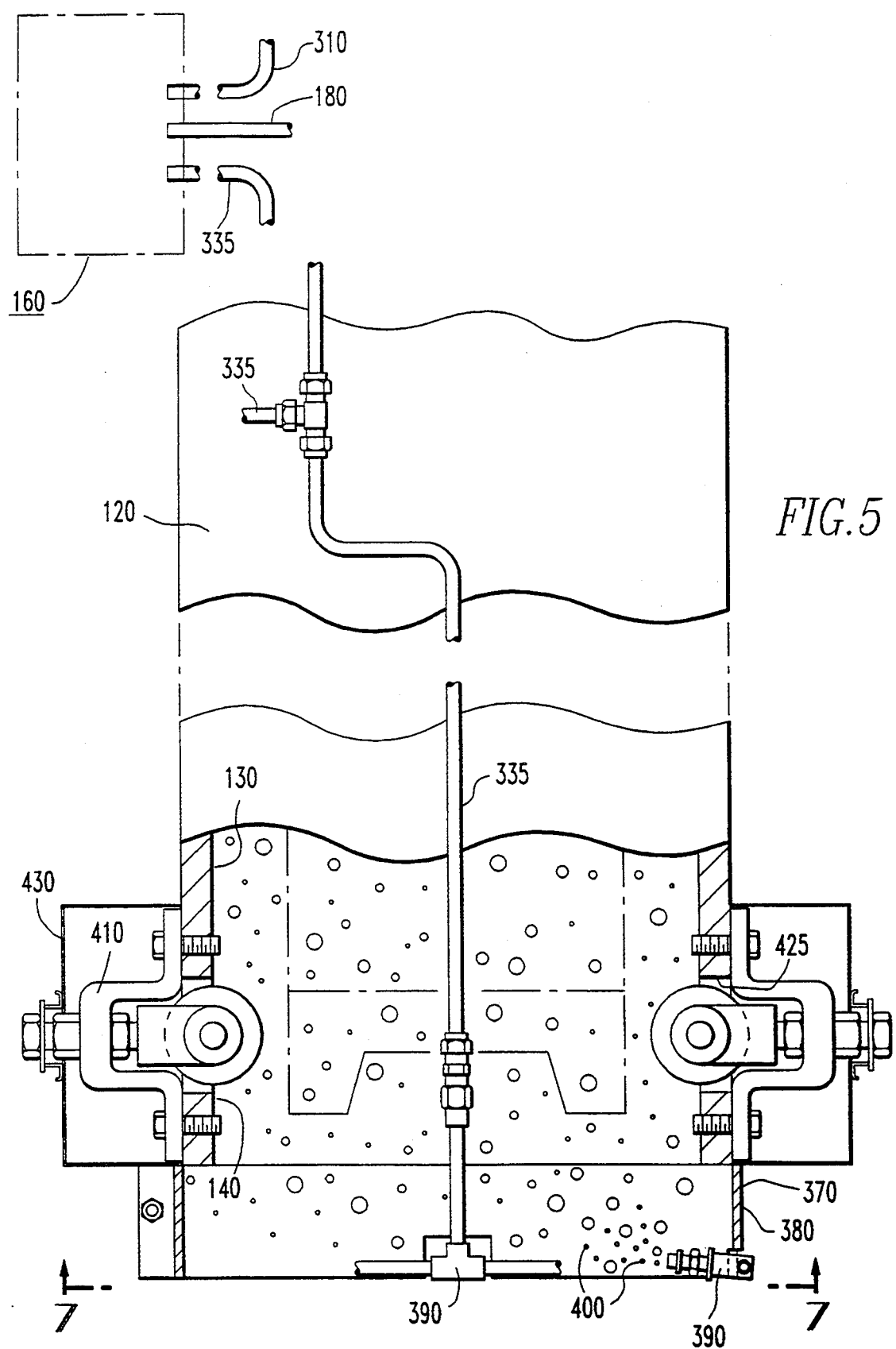
FIG. 5 is a view taken along section line 5—5 of FIG. 7 and shows in partial vertical section agas injection manifold in communication with the interior cavity defined by the enclosure for injecting a gas into the interior cavity to provide a multiplicity of upwardly moving gas bubbles in the liquid medium contained in the interior cavity.
Figure 8:
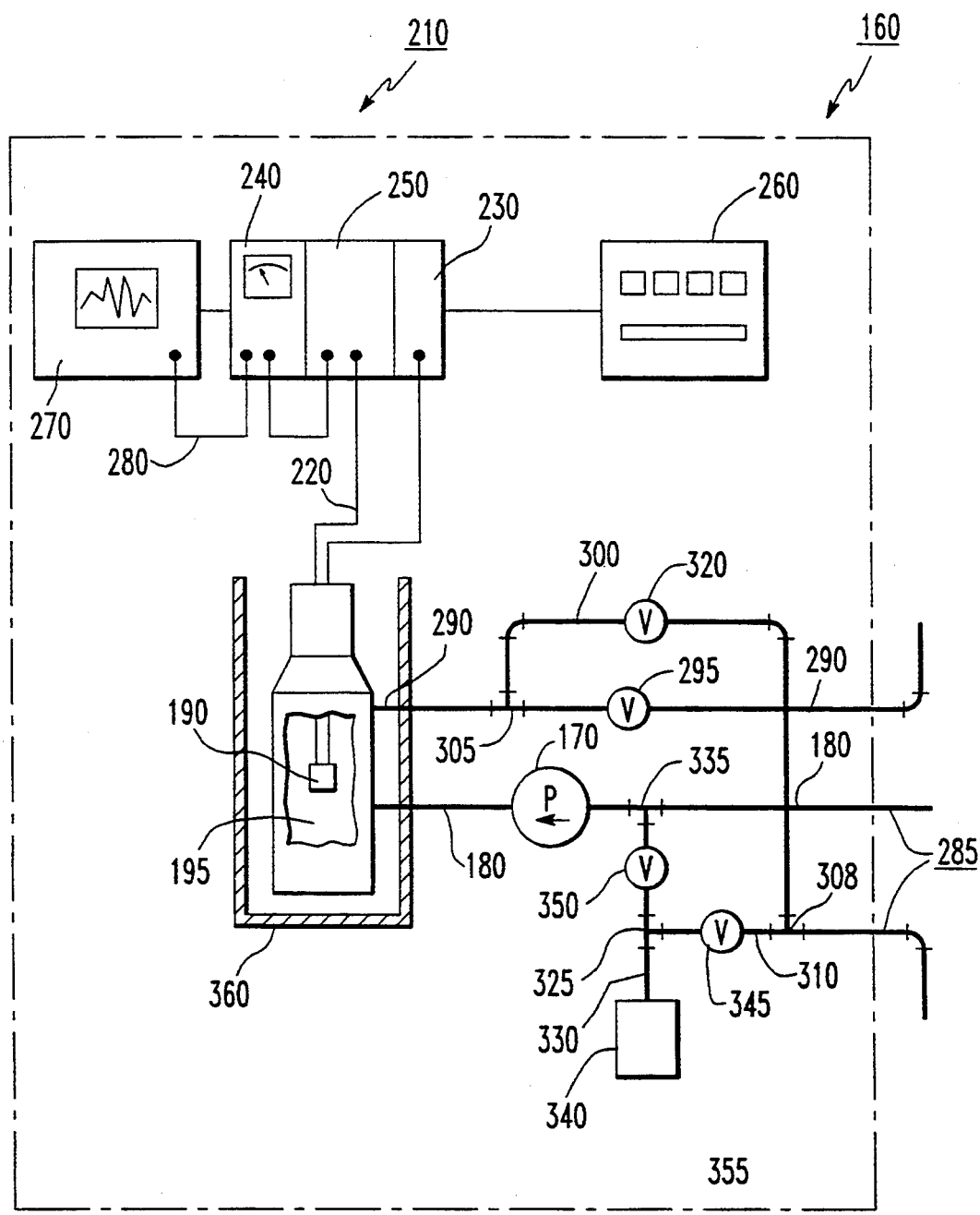
FIG. 8 illustrates detector means associated with the enclosure for detecting the fission product material leaking through the breach of the fuel rod disposed in the enclosure.

As best seen in FIGS. 5 and 8, leak-detection system 100 also comprises recirculation means, generally referred to as 287, and connected to enclosure 120 and to fluid injection means, for selectively discharging the gas to atmosphere or recirculating the gas to injection means 287, as disclosed in detail hereinbelow. In this regard, recirculation means 285 includes first conduit 180 which interconnects liquid-free volume 150 and suction pump 170 with sensor chamber 195 such that suction pump 170 suctions fission products 90 from liquid-free volume 150, through first conduit 180 and into sensor chamber 195. A second conduit 290 extends from sensor chamber 195 to the atmosphere for venting fission products 90 to the atmosphere. Disposed in second conduit 290 is a first valve 295 which is capable of opening and closing. A third conduit 300 has an end thereof connected, such as at location 305, to second conduit 290 and has the other end thereof connected, such as at location 308, to a fourth conduit 310, the purpose of which is described in more detail hereinbelow. Disposed in third conduit 300 so as to be interposed between locations 305/308 is a second valve 320 which is capable of opening and closing. Fourth conduit 310 is connected, as at location 325, to a fifth conduit 330. Fifth conduit 330 interconnects, as at location 335, a pressurized gas reservoir 340 with first conduit 180. In addition, disposed in fourth conduit 310, so as to be interposed between locations 308/325, is a third valve 345 which is capable of opening and closing. Moreover, disposed in fifth conduit 330, so as to be interposed between locations 325/335, is a fourth valve 350 which is capable of opening and closing. Furthermore, surrounding sensor chamber 195 may be a lead shielding wall 360 for shielding sensor 190 from external background radiation. Shielding sensor 190 enhances the radiation sensitivity of radiation-sensitive sensor 190. Radiation detector assembly 160 may be what is commonly referred to in the art as a "flow-through" beta-gama scintillation detector of the type available from Bicron Industries, Incorporated located in Newbury, Ohio.

Figure 7:
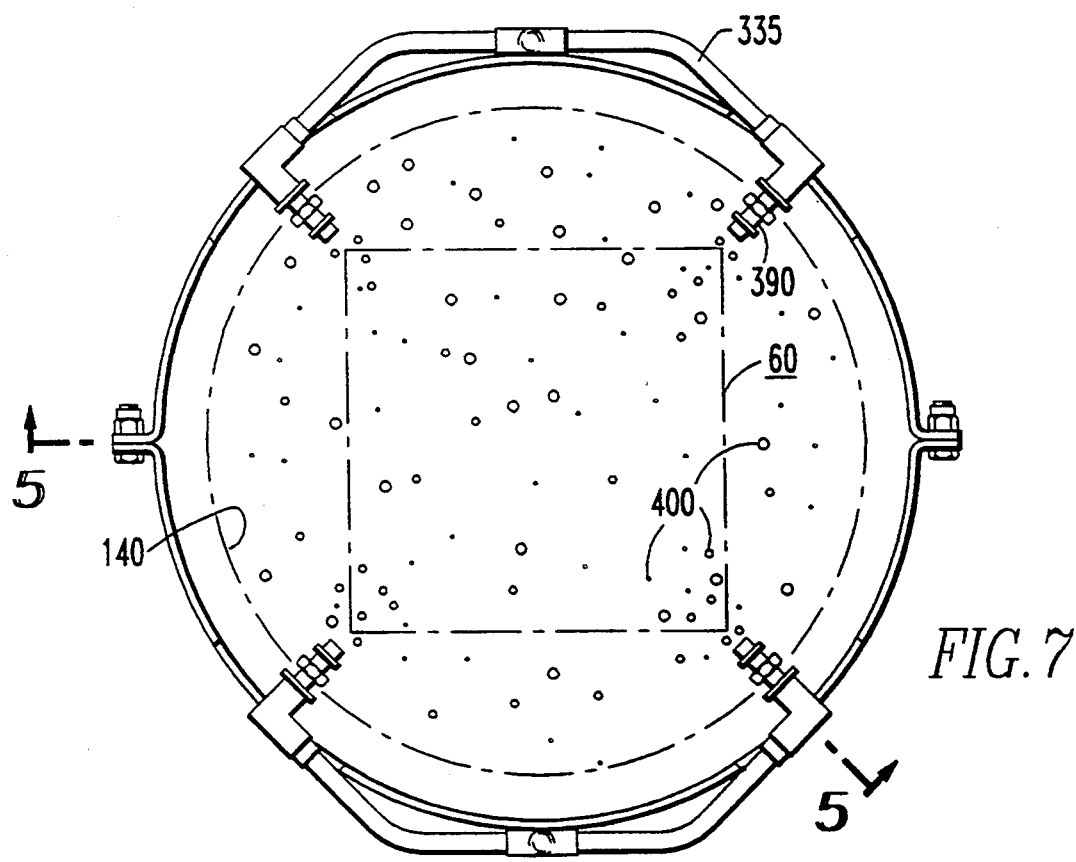
FIG. 7 is a view taken along section line 7—7 of FIG. 5.

Referring to FIGS. 5 and 7, leak-detection system 100 also comprises the previously mentioned fluid injection means 285, such as a gas injection manifold 370, connected to open lower end portion 140 of enclosure 120 for injecting a pressurized carrier fluid (e.g., air) into cavity 130 which is defined by enclosure 120. Gas injection manifold 370 may comprise a split ring member 380 surrounding open lower end portion 140. Injecting gas into cavity 130 assists in removing any fission product material 90 that may be adhering to exterior surface 75 of fuel rod 70 and also assists in carrying the fission material 90 removed thereby to liquid-free volume 150. In this regard, gas injection manifold 370 includes a plurality of injector nozzles 390 in fluid communication with liquid medium 85 for injecting the gas into liquid medium 85. As the gas is thus injected into liquid medium 85, a multiplicity of voids or bubbles 400 are formed in liquid medium 85, which bubbles 400 upwardly travel or rise in liquid medium 85 to encounter fission product material 90 adhering to exterior surface 75 of fuel rod 70. As bubbles 400 encounter fission product material 90, they will dislodge, disassociate, scrub or remove fission product material 90 from exterior surface 75 and upwardly carry fission product material 90 to liquid-free volume 150, so that fission product material 90 can be suctioned from liquid-free volume 150.

Figure 3:
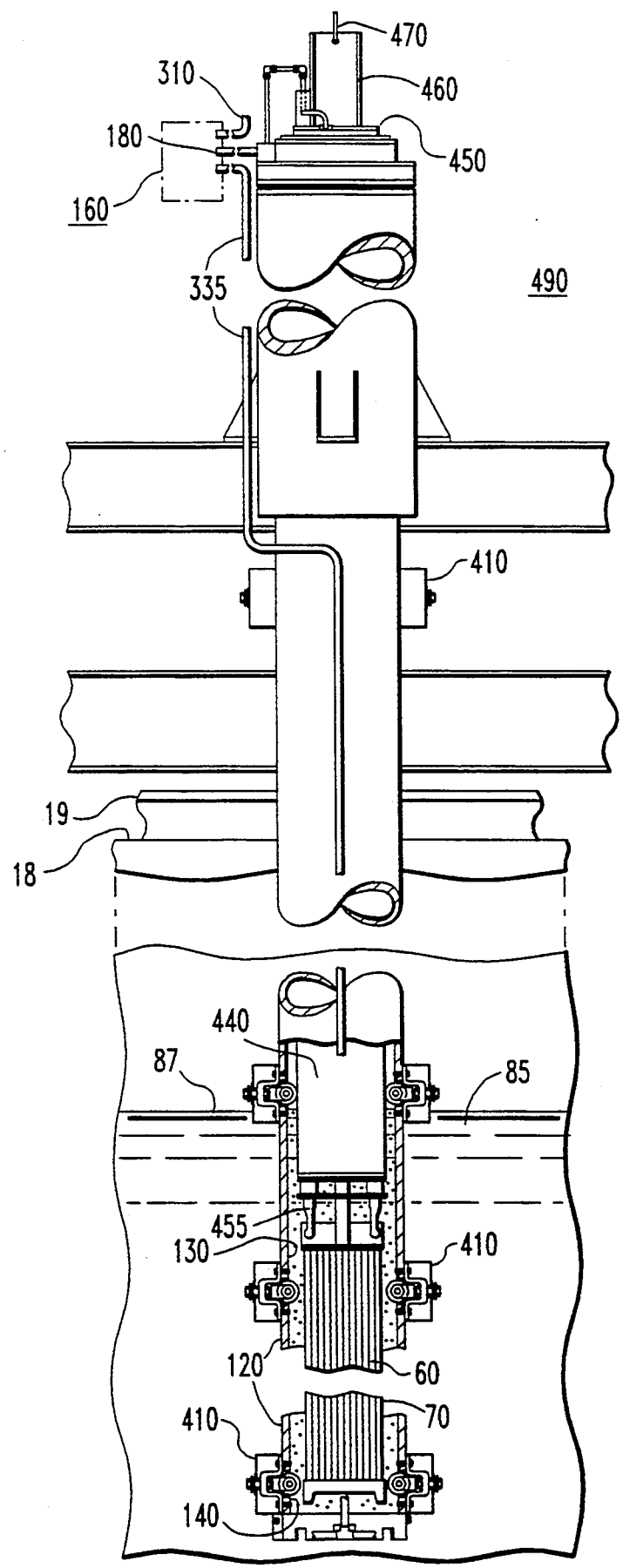
FIG. 3 shows in partial vertical section, an enclosure defining an interior cavity therein containing a liquid medium surrounding the fuel assembly.

Turning now to FIGS. 3 and 5, leak-detection system 100 also comprises alignment means, such as a plurality of spaced-apart roller assemblies 410, for aligning fuel assembly 60 coaxially within cavity 130, as described more fully hereinbelow. Roller assemblies 410 are spaced along the length of enclosure 120 and are respectively radially distributed around enclosure 120 for performing their alignment function. In this regard, each roller assembly 410 comprises a roller 420 penetrating enclosure 120 through an aperture 425 cut through enclosure 120. Fuel assembly 60 is preferably coaxially aligned within cavity 130 for proper alignment and insertion of the fuel assembly 60 back into the reactor core during routine refueling. A sealing cup 430 attached to the exterior of enclosure 120 sealingly surrounds each aperture 425 so that all the fission product material 90 is carried to liquid-free volume 150 to be suctioned therefrom. In this manner, fission product material 90 will not undesirably leak through aperture 425 and into reactor cavity 15.

Figure 2:
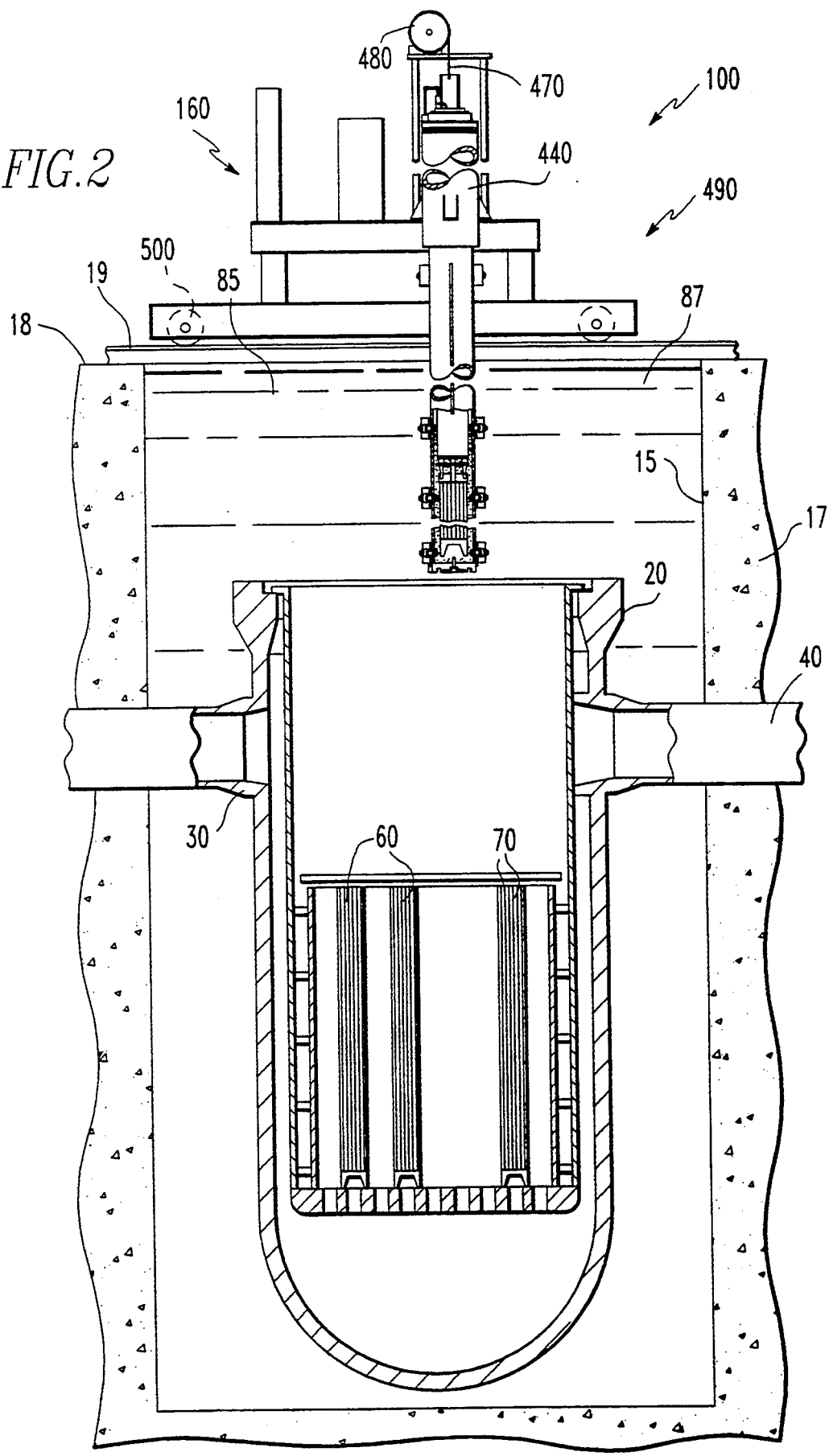
FIG. 2 shows in partial vertical section the closure head detached from the pressure vessel and one of the fuel assemblies gripped by an elevator, the fuel assembly including a plurality of fuel rods containing fission product material therein.
Figure 4:
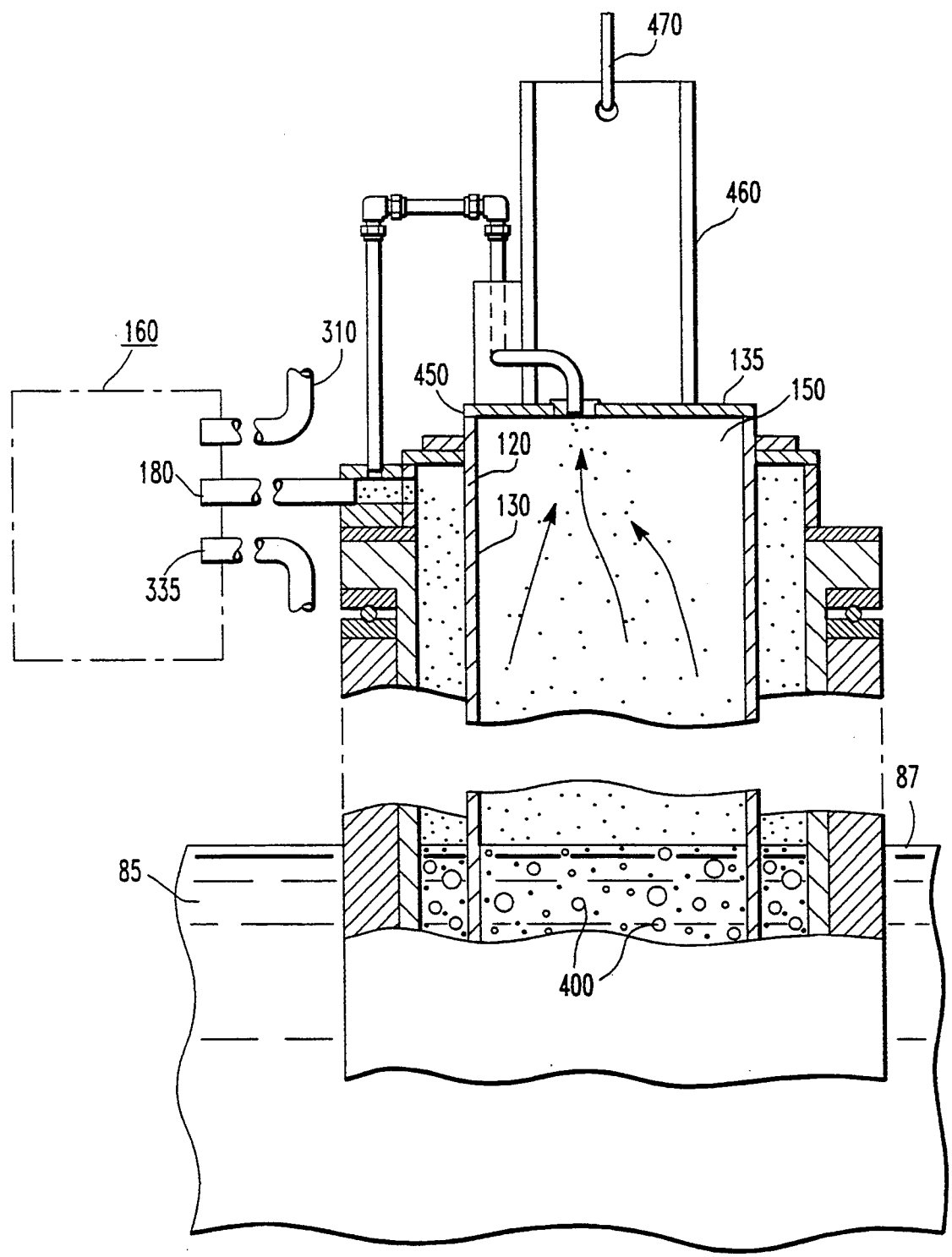
FIG. 4 is a fragmentation view in partial vertical section of the enclosure that defines the interior cavity containing the liquid medium, the interior cavity in turn defining a liquid-free volume above the liquid medium.

Referring to FIGS. 2, 3, and 4, system 100 further comprises pressure relief means connected to fuel assembly 60 for reducing or relieving the internal pressure in fuel rod 70, so that the fission product material 90 leaks from fuel rod 70 as the internal pressure is relieved. This feature of the invention is important in order to prevent fission product material 90 from "hiding-out" in fuel rod 70. In this regard, the pressure relief means comprises an elongate and axially movable elevator 440 capable of removably gripping fuel assembly 60 and then elevating fuel assembly 60 in cavity 130. Fuel assembly 60 is elevated so that the hydrostatic external pressure gradient acting against exterior surface 75 of the breached fuel rod 70 is reduced to relieve the internal pressure in the breached fuel rod 70. As the internal pressure is relieved, the radioactive fission product material 90 expands and migrates through breach 110. In this manner, fission product material 90 is prevented from "hiding-out" in the breached fuel rod 70. More specifically, elevator 440 has a capped top end portion 450 and includes a gripper 455 adapted to removably grip fuel assembly 60. Attached to top end portion 450 of elevator 440 is an adaptor 460 connected to a cable 470 that in turn engages a pulley 480. Pulley 480 is connected to a winch (not shown) for rotating pulley 480. When the winch is operated, pulley 480 rotates in a first direction for raising elevator 440, which in turn will elevate fuel assembly 60 in cavity 430. Similarly, the winch is capable of rotating pulley 480 in an opposite second direction for lowering elevator 440, which in turn will lower the elevation of fuel assembly 60 in cavity 430. Moreover, the previously mentioned rollers 420 are capable of slidably abutting and guiding elevator 440 for aligning fuel assembly 60 along the centerline of cavity 130.

Referring to FIGS. 2 and 3, a manipulator bridge or support frame, generally referred to as 490, is connected to axially movable elevator 440 and to stationary enclosure 120 for supporting elevator 440 and enclosure 120. Moreover, detector assembly 160 and pulley 480 may be mounted on support frame 490, as shown, so that detector assembly 160 and pulley 480 are suitably supported thereby. In addition, support frame 490 includes a plurality of wheels 500 adapted to slidably engage rail 19, so that support frame 490 is movable on rail 19 in order to align support frame 490 with a preselected one of fuel assemblies 60 to be leak-tested.

OPERATION

Leak-detection system 100 is capable of detecting leaks of fission product material 90 from any one of fuel assemblies 60 during routine refueling operations of the reactor core without the need for transporting fuel assembly 60 to a remote test chamber. In this regard, pressure vessel 20 is removed from service and closure head 50 is disconnected from atop pressure vessel 20. The upper internal structure of pressure vessel 20 is then removed in order to expose fuel assemblies 60. Next, support frame 490 is moved on rail 19 by rotatably engaging wheels 500 with rail 19, so that support frame 490 is aligned with a preselected one of the fuel assemblies 60 to be leaktested. At this point, stationary enclosure 120 will be caused to penetrate the liquid medium 85 of reactor cavity 15. AS enclosure 120 penetrates reactor cavity 15, the liquid medium 85 therein will flow through open lower end portion 140 of enclosure 120 to substantially fill cavity 130 to a level that defines fluid-free volume 50. The winch (not shown) is then operated to rotate pulley 480 so that elevator 440 is lowered, via cable 470, to a position that is coaxially aligned with the preselected one of the fuel assemblies 60. Next, gripper 455 is caused to securely grip the preselected fuel assembly 60 and raise it into cavity 15.

Leak-detection system 100 is then used to perform the leak-detection in accordance with the following modes of operation which may be performed sequentially: (a) "vacuum test" mode, (b) "flow test" mode, (c) "recirculation" mode, and (d) "purge" mode. Each of these modes of operation will be described in turn hereinbelow.

First, with respect to the vacuum test mode, first valve 295 is opened and then second valve 320, third valve 345 and fourth valve 350 are closed as suction pump 170 is operated. As suction pump 170 operates, the air within liquid-free volume 150 will be suctioned through first conduit 180 and into sensor chamber 195 to be detected by sensor 190. After passing into sensor chamber 195, the air will next flow into second conduit 290 and through open valve 295 on its way to the atmosphere. It will be understood from the description hereinabove that bubbles 400 are not generated to transport fission products 90 to liquid-free volume 150; rather, the purpose for operating in the vacuum test mode is to confirm that suction pump 170 will draw the necessary sample.

Secondly, with respect to the flow test mode, first valve 295 remains open as third valve 345 is opened. Second valve 320 and first valve 350 are closed as suction pump 170 is operated. The pressurized gas reservoir 340 is caused to supply the pressurized gas (e.g., air) into fifth conduit 330 and thence through fourth conduit 310 and its associated third valve 345. The gas then flows to gas injection manifold 370 for generating bubbles 400. As the bubbles 400 transport fission products 90 into liquid-free volume 150, suction pump 170 will suction fission products 90 through first conduit 180, into sensor chamber 195, through second conduit 290 and its associated first valve 295. The fission product material 90 will then flow to the atmosphere.

Thirdly, with respect to the recirculation or closed-loop mode, fourth valve 350 remains closed as first valve 295 and third valve 345 are closed and as second valve 320 is opened. Suction pump 170 continues operating. It will be understood from the description hereinabove that bubbles 400 are again generated to transport fission products 90 to liquid-free volume 150. More specifically, the bubbles are now provided by the output of vacuum pump 170. The vacuum pump 170 discharges the gas to gas injection manifold 370 to generate bubbles 400. As bubbles 400 transport fission products 90 into liquid-free volume 150, suction pump 170 will suction fission products 90 through first conduit 180, into sensor chamber 195, into second conduit 290, into third conduit 300, through second valve 320 and then into fourth conduit 310 on its way back to gas injection manifold 370. It will be appreciated from the description hereinabove that in the recirculation mode no fission products 90 are released to the atmosphere; rather, the fission products 90 are recirculated through enclosure 120. An important advantage of operating leak-detection system 100 in the recirculation or closed-loop mode is that it is possible to detect relatively small amounts of fission product material 90 released by relatively small-sized breaches 110 in fuel rod 70 because the recirculation mode allows the small releases of fission product-material 90 to accumulate within the closed-loop for detection.

Next, with respect to the purge mode, third valve 345 remains closed as second valve 320 is closed and as first valve 295 and fourth valve 350are opened. Suction pump 170 continues operating. The pressurized gas flows from gas reservoir 340, through fifth conduit 330 and then through open fourth valve 350. The gas then flows through suction pump 170 and into sensor chamber 195 via first conduit 180. The gas next flows from sensor chamber 195 through second conduit 290 and through open first valve 295 on its way to the atmosphere. The purpose of the purge mode is to purge or remove residual fission products 90 from enclosure 120, so that test results for the next fuel assembly to be leak-tested are not corrupted, influenced or contaminated by such residual fission products that would otherwise remain in leak-detection system 100. It will be appreciated from the description hereinabove that the purging mode is considered complete when sensor 190 detect relatively no fission products 90.

It will be understood from the description hereinabove that as the gas flows through fourth conduit 310 to injection manifold 370, it will exit injection nozzles 390 which are in fluid communication with liquid medium 85 in cavity 130. The gas injected into cavity 130 upwardly travels or rises therein and forms the multiplicity of voids or bubbles 400. The bubbles 400 encounter any fission product material 90 that may be passing through breach 110 and adhering to exterior surface 75 of fuel rod 70. As bubbles 400 encounter such fission product material 90, they will dislodge, disassociate, scrub or remove the fission product material 90 from exterior surface 75 and carry the fission product material removed thereby to liquid-free volume 150. The bubbles 400 will dissipate as they enter liquid-free volume 150 and will expel the fission product material 90 and gas mixture into liquid-free volume 150, so that fission product material 90 is substantially suspended in liquid-free volume 150. As fission product material 90 enters liquid-free volume 150, it is suctioned through first conduit 180 and into sensor chamber 195 by means of suction pump 170.

Once inside sensor chamber 195, sensor 190 will detect the presence of fission product material 90 therein. In this regard, high voltage supply 230 is caused to supply power to sensor 190 for activating sensor 190, so that sensor 190 detects the fission product material 90 in sensor chamber 195. As sensor 190 operates, it generates a sensor output signal. The output signal of sensor 190 is passed to analyzer 210 for analysis.

Amplifier 250, which belongs to analyzer 210, electrically interconnects sensor 190 and analog ratemeter 240. Ratemeter 240 displays the average counts per unit time (e.g., per second) of radiation detected by sensor 190. In this manner, the quantity or intensity of radiation is detected as a function of time.

Controller 260, which is electrically connected analyzer 210, controls the operation of analyzer 210. In addition, display 270, which is electrically connected to analyzer 210, receives the analyzer output signal and displays the analyzer output signal received thereby.

As previously described, some of the fission product material 90 may tend to "hide-out" within fuel rod 70 rather than readily migrate through breach 110. Fission product "hide-out" is undesirable because such "hide-out" of fission product material 90 within fuel rod 70 may cause a breached fuel rod 70 to be otherwise undetectable or at least imprecisely detected and analyzed. Therefore, it is desirable to coax such fission products from fuel rod 70 prior to beginning the flow test mode of operation. In order to coax the fission product material 90 through breach 110 of fuel rod 70, the winch (not shown) rotates pulley 480 for elevating elevator 440 a predetermined amount (e.g., approximately 24 feet). As elevator 440 is elevated by the predetermined amount, the hydrostatic pressure will acting against the exterior surface 75 of each breached fuel rod 70 is preferably reduced by about 20 pounds per square inch. This reduction in external hydro-static pressure relieves the internal fuel rod pressure and will cause the fission product gases and/or solids "hiding-out" within fuel rod 70 to expand and migrate through breach 110 because the internal pressure of fuel rod 70 after elevation thereof is less than before elevation of fuel rod 70. However, as the fission product material 90 is coaxed through breach 110, it may tend to adhere to exterior surface 75 of fuel rod 70. The fission product material 90 tending to adhere to exterior surface 75 of fuel rod 70 will be removed therefrom by action of bubbles 400, as previously described, so that fission product material 90 is carried to liquid-free volume 150 to be suctioned therefrom in order to be precisely detected by sensor 190.

Although the invention is fully illustrated and described herein, it is not intended that the invention as illustrated and described be limited to the details shown, because various modifications may be obtained with respect to the invention without departing from the spirit of the invention or the scope of equivalents thereof. For example, leak-detection system 100 need not be limited to detecting leaks of fission product material from nuclear fuel rods; rather, leak-detection system 100 including a detector suitable for the material being detected is usable for detecting leaks from any similar container having material leaking therefrom.

Therefore, what is provided is a leak-detection system and method for detecting a leaking container, which leaking container may be a leaking nuclear fuel rod having a radioactive fission product material leaking therefrom.

What is claimed is:

1. A leak-detection system for detecting a leaking container having a surface thereon and a material leaking therefrom, the material capable of adhering to the surface of the container as the material leaks from the container, comprising:
   (a) enclosure means surrounding the container for enclosing the container;
   (b) detector means associated with said enclosure means for detecting the leaking material; and
   (c) fluid injection means associated with said enclosure means for injecting a fluid into said enclosure means to remove the material adhering to the surface and to carry the material removed thereby to said detector means, so that said detector means detects the material leaking from the container.

2. The leak-detection system of claim 1, further comprising recirculating means connected to said enclosure means and to said fluid injection means for recirculating the fluid through said enclosure means.

3. A leak-detection system for detecting a leaking container having an exterior surface thereon and a material leaking therefrom, the container having a predetermined internal pressure, the material capable of adhering to the exterior surface of the container as the material leaks from the container, comprising:
   (a) enclosure means surrounding the container for enclosing the container;
   (b) detector means connected to said enclosure means for detecting the leaking material;
   (c) fluid injection means connected to said enclosure means for injecting a fluid into said enclosure means to remove the material adhering to the exterior surface and to carry the material removed thereby to said detector means so that said detector means detects the material leaking from the container; and
   (d) pressure relief means connected to the container for elevating the container for relieving the internal pressure in the container, so that the material is prevented from hiding-out in the container as the internal pressure is relieved.

4. The leak-detection system of claim 3, further comprising recirculation means connected to said enclosure means and to said fluid injection means for recirculating the fluid through said enclosure means.

5. A leak-detection system for detecting a leaking container having a radioactive material leaking through a breach in an exterior surface of the container, the container having a predetermined internal pressure, the radioactive material capable of adhering to the exterior surface as the radioactive material leaks through the breach, comprising:

(a) an enclosure defining a cavity therein surrounding the container for enclosing the container, the cavity containing a fluid medium covering the exterior surface and defining an external pressure acting against the exterior surface;

(b) a radiation detector in communication with the cavity defined by said enclosure for detecting the radioactive material leaking through the breach;

(c) a gas injector in communication with the cavity defined by said enclosure for injecting a gas into the cavity to remove the radioactive material adhering to the exterior surface and to carry the radioactive material removed thereby to said radiation detector, so that said radiation detector detects the radioactive material leaking from the container in order to detect the leaking container;

(d) an elevator connected to the container for elevating the container in the cavity, so that the external pressure acting against the exterior surface is reduced to relieve the internal pressure in the container and so that the radioactive material leaks through the breach as the internal pressure is relieved to prevent the radioactive material from hiding-out in the container.

6. The leak-detection system of claim 5, wherein said radiation detector comprises:

(a) a suction pump in communication with the cavity defined by said enclosure for suctioning the radioactive material therefrom;

(b) a radiation-sensitive sensor in communication with the suction pump for sensing the radiation of the radioactive material suctioned by the suction pump, said sensor adapted to generate a sensor output signal in response to the radiation sensed thereby;

(c) an analyzer connected to said sensor for receiving the sensor output signal and for providing an analysis of the sensor output signal, said analyzer adapted to generate an analyzer output signal associated with the analysis provided thereby; and (d) a controller connected to said analyzer for controlling said analyzer.

7. The leak-detection system of claim 6, wherein said radiation detector further comprises a display connected to said analyzer for receiving the analyzer output signal and for displaying the analyzer output signal received thereby.

8. The leak-detection system of claim 5, further comprising a recirculation assembly in communication with the cavity defined by said enclosure and connected to said gas injector for recirculating the gas through said enclosure after being analyzed by said analyzer.

9. The leak-detection system of claim 5, further comprising a support frame connected to said elevator and to said enclosure for supporting said elevator and said enclosure.

10. A leak-detection system for detecting a leaking nuclear fuel rod having a radioactive fission product material leaking through a breach in an exterior surface of the fuel rod, the fuel rod having a predetermined internal pressure, the radioactive fission product material capable of adhering to the exterior surface of the fuel rod as the radioactive fission product material leaks through the breach, the leak-detection system comprising:

(a) a stationary enclosure defining a cavity surrounding the fuel rod for enclosing the fuel rod therein, the cavity containing a liquid medium covering the exterior surface of the fuel rod and defining a liquid-free volume in the cavity, the liquid medium defining a hydrostatic pressure acting against the exterior surface of the fuel rod;

(b) a radiation detector in communication with the liquid-free volume for detecting the radioactive fission product material leaking through the breach, said radiation detector including:

i) a suction pump in communication with the liquid-free volume for suctioning the radioactive fission product material therefrom;

ii) a radiation-sensitive sensor in communication with said suction pump for sensing the radiation of the radioactive fission product material suctioned by said suction pump, said sensor adapted to generate a sensor output signal in response to the radiation sensed thereby;

iii) an analyzer connected to said sensor for receiving the sensor output signal and for providing an analysis of the sensor output signal, said analyzer adapted to generate an analyzer output signal associated with the analysis provided thereby;

iv) a controller connected to said analyzer for controlling said analyzer;

v) a display connected to said analyzer for receiving the analyzer output signal and for displaying the analyzer output signal received thereby;

(c) a gas injection manifold in communication with the liquid medium contained in the cavity defined by said enclosure for injecting a gas into the liquid medium to provide a multiplicity of upwardly rising gas bubbles in the liquid medium, the gas bubbles capable of removing the radioactive fission product material adhering to the exterior surface and capable of carrying the radioactive fission product material removed thereby to the liquid-free volume, so that the radioactive fission product material is suctioned from the liquid-free volume and into said suction pump and thereafter travels to said radiation detector for detecting the leaking fuel rod; and (d) a movable elevator connected to said fuel rod for elevating the fuel rod in the cavity defined by said enclosure, so that the hydrostatic pressure acting against the exterior surface of the fuel rod is reduced to relieve the internal pressure in the fuel rod and so that the radioactive fission product material expands and thereafter leaks through the breach as the internal pressure is relieved to prevent the radioactive fission product material from hiding-out in the fuel rod.

11. The leak-detection system of claim 10, further comprising a recirculation assembly in communication with the liquid-free volume defined by said enclosure and connected to said gas injection manifold for recirculating the fission product material through said enclosure.

12. The leak-detection system of claim 10, further comprising a support frame connected to said elevator and to said enclosure for supporting said elevator and said enclosure.

13. A leak-detection method for detecting a leaking container having a material leaking from an exterior surface thereof, the material capable of adhering to the exterior surface of the container, comprising the steps of:

(a) enclosing the container by surrounding the container with an enclosure;

(b) detecting the material leaking from the container by operating a detector associated with the enclosure; and (c) injecting a fluid into the enclosure for removing the material adhering to the exterior surface and for carrying the material to the detector, so that the detector detects the material leaking from the container.

14. The leak-detection method of claim 13, further comprising the step of recirculating the fluid through the enclosure.

15. A leak-detection method for detecting a leaking nuclear fuel rod having a radioactive fission product material leaking through a breach in an exterior surface of the fuel rod, the fuel rod having a predetermined internal pressure, the radioactive fission product material capable of adhering to the exterior surface as the radioactive fission product material leaks through the breach, the leak-detection method comprising the steps of:

(a) enclosing the fuel rod by surrounding the fuel rod with an enclosure defining a cavity in the enclosure, the cavity containing a liquid medium therein covering the exterior surface of the fuel rod and defining an external pressure acting against the exterior surface of the fuel rod, the cavity defining a liquid-free volume in the cavity;

(b) injecting a gas into the liquid medium by operating a gas injector in communication with the liquid medium so that a multiplicity of upwardly rising gas bubbles are generated in the liquid medium for removing the radioactive fission product material adhering to the exterior surface of the fuel rod and for carrying the radioactive fission product material removed thereby to the liquid-free volume;

(c) detecting the radioactive fission product material leaking through the breach by operating a radiation detector in communication with the liquid-free volume; and (d) elevating the fuel rod in the cavity defined by the enclosure by operating an elevator connected to the fuel rod so that the external pressure acting against the exterior surface is reduced to relieve the internal pressure in the fuel rod and so that the radioactive fission product material expands and thereafter leaks through the breach as the internal pressure is relieved to prevent the radioactive fission product material from hiding-out in the fuel rod.

16. The leak-detection method of claim 15, wherein said step of detecting the radioactive fission product material comprises the steps of:

(a) suctioning the radioactive fission product material from the liquid-free volume by operating a suction pump in communication with the liquid-free volume;

(b) sensing the radiation of the radioactive fission product material suctioned by the suction pump by operating a radiation-sensitive sensor in communication with the suction pump, the sensor capable of generating a sensor output signal in response to the radiation sensed by the sensor;

(c) providing an analysis of the sensor output signal by operating an analyzer connected to the sensor, the analyzer capable of receiving the sensor output signal and thereafter capable of generating an analyzer output signal associated with the analysis provided by the analyzer; and (d) controlling the analyzer by operating a controller connected to the analyzer.

17. The leak-detection method of claim 16, wherein said step of detecting the radioactive fission product material further comprises the step of displaying the analyzer output signal by operating display connected to the analyzer.

18. The leak-detection method of claim 15, further comprising the step of recirculating the gas through the enclosure.

19. The leak-detection method of claim 18, wherein said step of recirculating the gas through the enclosure comprises the steps of:

(a) withdrawing the fission product material from the liquid-free volume defined by the cavity by operating a recirculating assembly in communication with the liquid-free volume; and (b) returning the collected gas to the cavity by operating the recirculation assembly.

20. The leak-detection method of claim 15, further comprising the step of supporting the elevator and the enclosure by providing a support frame connected to the elevator and the enclosure.

* * * * *